United States Patent
Lee et al.

(10) Patent No.: US 7,432,995 B2
(45) Date of Patent: Oct. 7, 2008

(54) LIQUID CRYSTAL DISPLAY DEVICE COMPRISING ONE PAIR OF THIN FILM TRANSISTORS PER PIXEL AND METHOD FOR FABRICATING THE SAME

(75) Inventors: Jae Kyun Lee, Gunpo-shi (KR); Dong Hoon Lee, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 8 days.

(21) Appl. No.: 10/875,294

(22) Filed: Jun. 25, 2004

(65) Prior Publication Data

US 2004/0263744 A1   Dec. 30, 2004

(30) Foreign Application Priority Data

Jun. 26, 2003   (KR) .................. 10-2003-0042032

(51) Int. Cl.
    *G02F 1/136* (2006.01)
    *G02F 1/1343* (2006.01)
    *G09G 3/36* (2006.01)

(52) U.S. Cl. .................. 349/48; 349/38; 349/43; 349/141; 345/92

(58) Field of Classification Search .......... 349/48, 349/54, 39, 93, 38, 43, 141; 345/93
See application file for complete search history.

(56) References Cited

U.S. PATENT DOCUMENTS

| | | | | |
|---|---|---|---|---|
| 4,762,398 A | * | 8/1988 | Yasui et al. | 349/43 |
| 5,003,356 A | * | 3/1991 | Wakai et al. | 257/390 |
| 5,285,302 A | * | 2/1994 | Wu | 349/43 |
| 6,281,957 B1 | * | 8/2001 | Oh et al. | 349/141 |
| 6,429,842 B1 | * | 8/2002 | Shin et al. | 345/92 |
| 6,862,052 B2 | * | 3/2005 | Kim | 349/54 |
| 2002/0021381 A1 | * | 2/2002 | Yoo et al. | 349/43 |
| 2002/0158997 A1 | * | 10/2002 | Fukami et al. | 349/49 |

* cited by examiner

*Primary Examiner*—Andrew Schechter
*Assistant Examiner*—W. Patty Chen
(74) *Attorney, Agent, or Firm*—McKenna Long & Aldridge LLP

(57) ABSTRACT

A liquid crystal display device having thin film transistors arranged in a zigzag pattern at opposite sides of a gate line, and method for fabricating the same to prevent occurrence of a Cgd variation, even when gate lines or data lines are misaligned in Y- or Z-axis direction, and a defective interface caused by stitching. The device includes a plurality of gate lines arranged on a substrate in one direction, a plurality of data lines substantially perpendicular to the gate lines to define pixel regions, and one pair of thin film transistors per pixel region, the pair of thin film transistors including one pair of first and second gate electrodes projected from the gate lines, a drain electrode substantially parallel to the gate lines, having opposite ends overlapping the first and second gate electrodes, and a source electrode projected from the data lines so as to be adjacent to the opposite ends of the drain electrode and overlap the first and second gate electrodes.

29 Claims, 5 Drawing Sheets

LIQUID CRYSTAL DISPLAY DEVICE COMPRISING ONE PAIR OF THIN FILM TRANSISTORS PER PIXEL AND METHOD FOR FABRICATING THE SAME

This application claims the benefit of the Korean Application No. P2003-0042032 filed on Jun. 26, 2003, which is hereby incorporated by reference for all purposes as if fully set forth herein.

BACKGROUND OF THE INVENTION

1. Field of the Invention

The present invention relates to liquid crystal display devices and a method for manufacturing the same. More particularly, the present invention relates to a liquid crystal display device (LCD) having thin film transistors arranged in a zigzag pattern at opposite sides of a gate line to prevent the occurrence of Cgd variation, even when gate lines or data lines are misaligned in the Y- or Z-axis direction, and a defective interface caused by stitching.

2. Background of the Related Art

In keeping pace with the developments of an information oriented society, the demands for display devices have gradually increased in various forms. To meet the demands, various flat display devices, such as Liquid Crystal Display (LCD), Plasma Display Panel (PDP), Electro Luminescent Display (ELD), and Vacuum Fluorescent Display (VFD), have been studied.

Of the various types of display devices, the LCD is used the most for mobile display devices because of its advantages, i.e., good picture quality, light weight, thinness, and low power consumption and has replaced the Cathode Ray Tube (CRT). Besides the mobile display devices, such as monitors for notebook computers, the LCD has been used as monitors for televisions to receive and display broadcast signal, and as monitors for computers.

The LCD device includes a liquid crystal panel for displaying a picture and a driving part for applying a driving signal to the liquid crystal panel. The liquid crystal panel is provided with opposite first and second glass substrates, and a liquid crystal layer between the first and second glass substrates.

The first glass substrate (also called a TFT array substrate) includes a plurality of gate lines arranged at regular intervals in one direction, a plurality of data lines arranged at regular intervals perpendicular to the gate lines, a plurality of pixel electrodes on sub-pixel regions defined by the gate lines and the data lines in a form of a matrix, and a plurality of thin film transistors that are to be switched in response to signals on the gate lines for transmission of signals on the data lines to the pixel electrodes.

On the second glass substrate (also called a color filter substrate), there are a black matrix layer for shielding a light to parts excluding the sub-pixel regions, R, G, B color filter layers for displaying colors, and a common electrode for displaying a picture. In an IPS type LCD, the common electrode is on the first glass substrate.

FIG. 1 illustrates a related art LCD circuit having a zigzag TFT arrangement, including a plurality of gate lines G1~Gn, Gn+1, Gn+2 . . . , a plurality of common lines Vcom_odd, and Vcom_even parallel to and between the gate lines, a plurality of data lines D1~Dm, Dm+1, Dm+1 . . . perpendicular to the gate lines, and TFTs arranged in a zigzag pattern at opposite sides of the gate lines, i.e., at an X-axis, each connected to the gate line, the data line, and the common line.

The thin film transistor TFT has a drain electrode 'd' connected to an adjacent pixel electrode 'P', a gate electrode 'g' connected to the gate line Gn, and a source electrode 's' connected to the data line Dm. There are a capacitor having a liquid crystal capacitance Clc, and a capacitor having a storage capacitance Cst connected in parallel between the drain electrode 'd' and the common electrode. The liquid crystal capacitance Clc, and the storage capacitance Cst act as a load the TFT-LCD is required to drive. There can be parasitic capacitance Cgd caused by misalignment between the gate electrode 'g' and the drain electrode 'd'.

In the TFT-LCD, after making the TFT conductive by applying a gate-on voltage to the gate line Gn connected to the gate electrode 'g' intended to display, a data voltage indicating a picture signal is applied to the source electrode 's', to apply a data voltage to the drain electrode 'd'. Accordingly, the data voltage is applied to capacitors of the liquid crystal capacitance Clc, and the storage capacitance Cst respectively, and a field is formed by a voltage difference of the pixel electrode and the common electrode Vcom.

FIG. 2 illustrates a plan view of the LCD in FIG. 1.

Referring to FIG. 2, the LCD is provided with a plurality of gate lines 11 arranged at regular intervals in one direction, and a plurality of data lines 13 perpendicular to the gate lines 11 at regular intervals, to define pixel regions on a transparent lower substrate (not shown). The gate lines 11 and the data lines 13 cross to define the pixel regions, and the thin film transistors TFT1, and TFT2 are formed on respective cross regions.

The thin film transistor has a gate electrode 1a projected from the gate line 11, a gate insulating film on an entire surface of the lower substrate inclusive of the gate electrode 11a, an active layer 12 on the gate insulating film over the gate electrode 11a, a source electrode 13a projected from the data line 13 in a ' ⊂ ' form, and a drain electrode 13b between two forks of the source electrode 13a.

There are a common line 11b and a plurality of common electrodes 11c on the same layer with the gate line 11, wherein the common line 11b crosses the pixel region parallel to the gate line 11, and the plurality of common electrodes 11c are arranged on the pixel region parallel to the data line 13. The common electrodes 11c are symmetric with reference to the common line 11b in an up/down direction and connected to each other.

There are a protection film (not shown) on an entire surface of the lower substrate inclusive of the data line 13 and a pixel electrode between the common electrodes 11c. The pixel electrodes 13c are also symmetric with reference to the common line 11b in an up/down direction. The pixel electrode 13c is connected to the drain electrode 13b to form a unit. There is a storage electrode 13d connected to the pixel electrode 13c on the common line 11b, to form a Storage On Common structure.

When the TFTs are arranged at opposite sides of the gate line in zigzag, if misalignment occurs in a Y-axis direction, resulting to change an overlap area of the gate electrode and the drain electrode of the TFT, a Cgd difference occurs between adjacent pixel regions.

Moreover, when the liquid crystal display device is applied to a large sized liquid crystal panel, if misalignment occurs at a shot interface region of the large sized liquid crystal panel fabricated in multi-shot, a potential problem of defective interface region coming from stitching due to the Cgd difference between the adjacent pixels.

SUMMARY OF THE INVENTION

Accordingly, the present invention is directed to a liquid crystal display device and a method for fabricating the same that substantially obviates one or more of the problems due to limitations and disadvantages of the related art.

An advantage of the present invention is to provide a liquid crystal display device and a method for fabricating the same, which can prevent occurrence of a Cgd difference caused by misalignment of a gate line and a data line, and defective interface caused by stitching.

Additional features and advantages of the invention will be set forth in the description which follows, and in part will be apparent from the description or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, the liquid crystal display device includes a plurality of gate lines arranged on a substrate in one direction, a plurality of data lines substantially perpendicular to the gate lines to define pixel regions, and one pair of thin film transistors per pixel region including one pair of first and second gate electrodes projected from the gate lines, a drain electrode substantially parallel to the gate lines, having opposite ends overlapping the first and second gate electrodes, and a source electrode projected from the data lines so as to be adjacent to the opposite ends of the drain electrode and overlap the first and second gate electrodes.

In another embodiment of the present invention, a method for fabricating a liquid crystal display device, includes providing a substrate, forming a plurality of gate lines in one direction on the substrate, forming data lines substantially perpendicular to the gate lines to define pixel regions, each pixel region having one pair of first and second gate electrodes, forming a source electrode projected from the data lines and partly overlapping one side of each of the first and second gate electrodes, and forming a drain electrode substantially parallel to the gate lines, the drain electrode having opposite ends overlapping the first and second gate electrodes, and adjacent to the source electrode.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Figure 1:
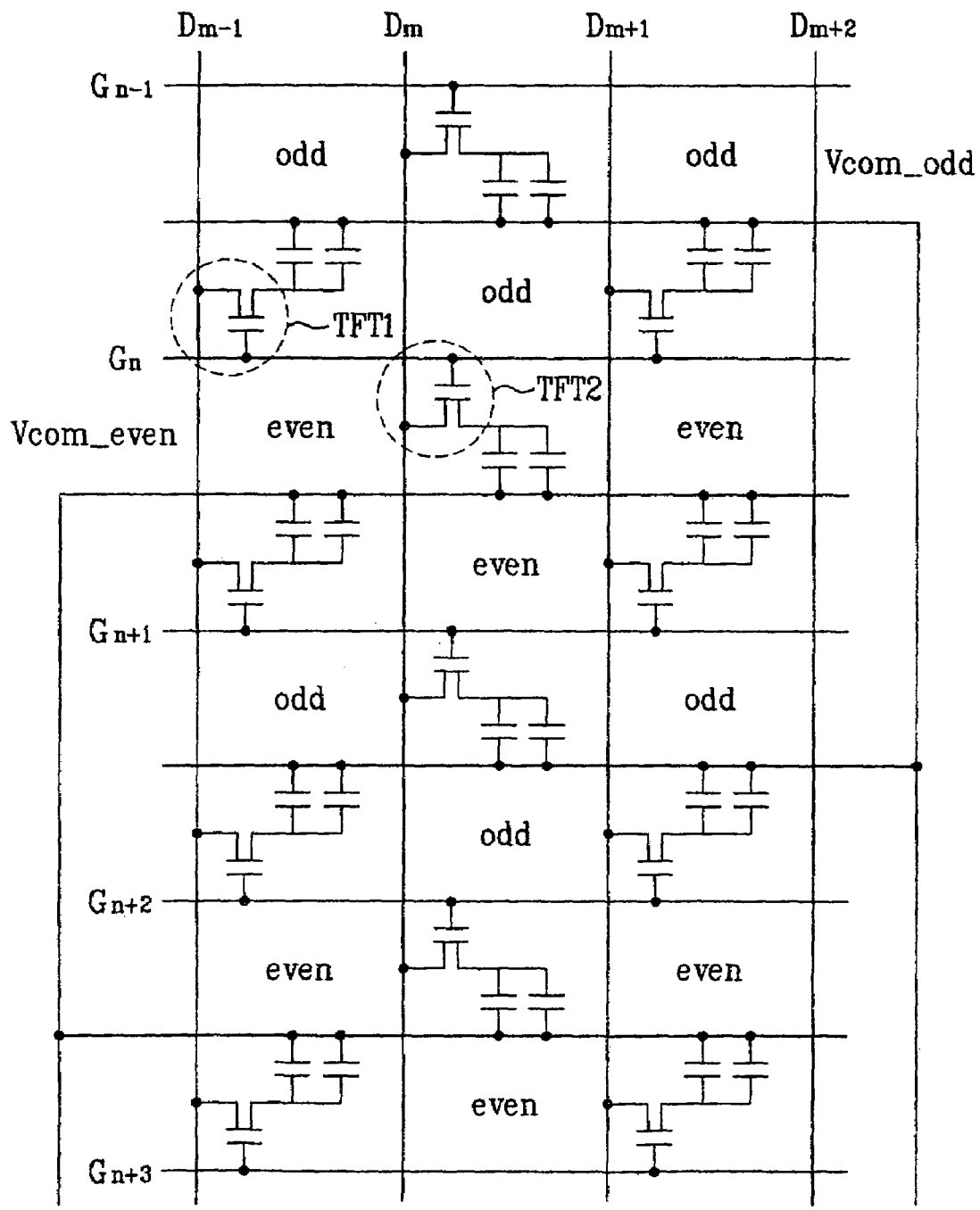
FIG. 1 illustrates a related art LCD circuit having a zigzag TFT arrangement.
Figure 2:
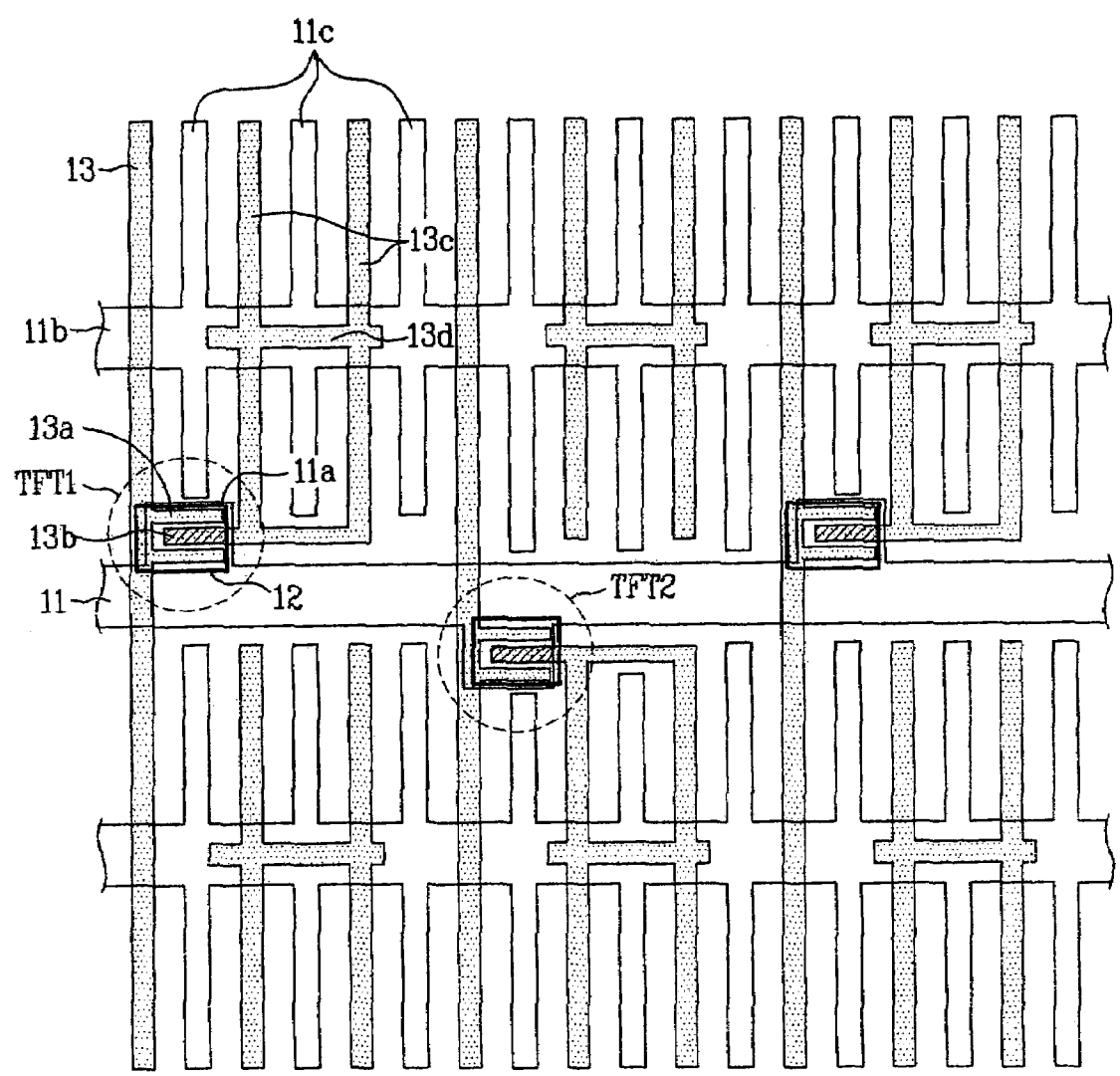
FIG. 2 illustrates a plan view of the LCD in FIG. 1.
Figure 3:
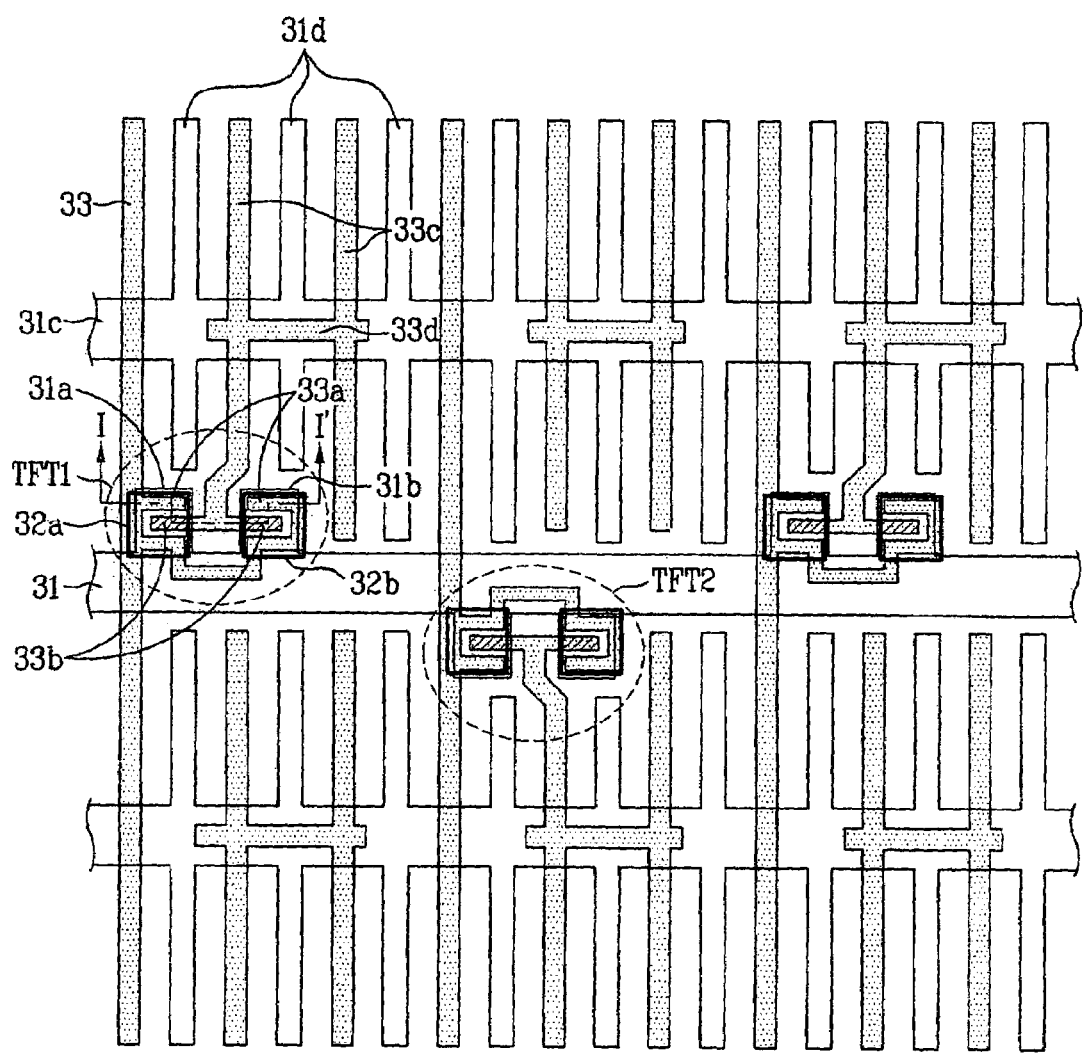
FIG. 3 illustrates a plan view of an LCD in accordance with a first embodiment of the present invention.

Reference will now be made in detail to embodiments of the present invention, examples of which are illustrated in the accompanying drawings. FIG. 3 illustrates a plan view of an LCD in accordance with a first embodiment of the present invention.

Referring to FIG. 3, the liquid crystal display device includes a plurality of gate lines 31 at regular intervals in one direction, and a plurality of data lines 33 substantially perpendicular to the gate lines 31 at regular intervals to define pixel regions on a transparent lower substrate (not shown).

The gate lines 31 and the data lines 33 cross to define the pixel regions. There is one pair of thin film transistors on the pixel region. A plurality of pairs of the thin film transistors are arranged in a zigzag pattern at opposite sides of the gate line 31 and extended in a direction along the x-axis.

The one pair of the thin film transistors in the pixel region includes one pair of first and second gate electrodes 31a and 31b projected from two parts of one side of the gate line 31, a drain electrode 33b parallel to the gate line 31, having opposite ends overlapping the first and second gate electrodes 31a and 31b, and a source electrode 33a projected from one side of the data line 33 so as to be adjacent to the opposite ends of the drain electrode 33b and overlapping the first and second gate electrodes 31a and 31b. The source electrodes 33a include first and second parts, respectively, surrounding the opposite ends of the drain electrode 33b, and a third part connecting the first part and the second part. The first part and the second part, in C shaped forms, are symmetric to each other. The drain electrode 33b are shared by the one pair of the thin film transistors formed in one pixel region.

According to the above structure, the one pair of the thin film transistors in one pixel region forms a '⊂' and '⊃' in channel regions.

There are a common line 31c and a plurality common electrodes 31d on the same layer with the gate line 31, wherein the common line 31 crosses the pixel region substantially parallel to the gate line 31, and the plurality of common electrodes 31d are arranged on the pixel region substantially parallel to the data line 33.

The common electrodes 31d are symmetric with reference to the common line 31c in an up/down direction, and connected to each other. The pixel electrodes 33c are also symmetric with reference to the common line 31c in an up/down direction. The pixel electrodes 33c are formed as a unit with the drain electrode 33b.

There is a storage electrode 33d on a part of the common line 31c and formed as a unit with the pixel electrode 33c. The storage electrode 33d is a Storage On Common Structure and may be formed in a Hybrid Storage structure having the Storage On Common structure and a Storage On Gate mixed therein.

There is a protection film (not shown) on an entire surface of the lower substrate, inclusive of the data line 33 and the pixel electrodes. The liquid crystals between the common electrodes 31d and the pixel electrodes 33c are oriented in the same direction by a field between the common electrodes 31d and the pixel electrodes 33c to form one domain to enable fabrication of an LCD with a wider view angle in an in-plane switching (IPS) type because a plurality of domains can be formed within a pixel region.

Because the first and second gate electrodes 31a and 31b are projected from two parts of one side of the gate line 31 and the opposite ends of the drain electrodes 33b respectively overlap the first and second gate electrodes 31a and 31b within each pixel, even if the gate line 31 and the data line 33 are misaligned in a left/right direction (an X-axis direction), reduction of the Cgd can be prevented because the overlapped areas between the first and second gate electrodes 31a and 31b and the drain electrode 33 supplement each other.

Moreover, because the drain electrode is substantially parallel to the gate line 31, even if the gate line 31 and the data line 33 misalign in an up/down direction (a Y-axis direction), because there is no Cgd difference between adjacent pixel regions, the problem of a defective interface region caused by stitching can be solved.

Though the foregoing thin film transistor is applied to the IPS type LCD, the thin film transistor can also be applied to a TN type LCD and the same effect can be derived.

Figure 4:
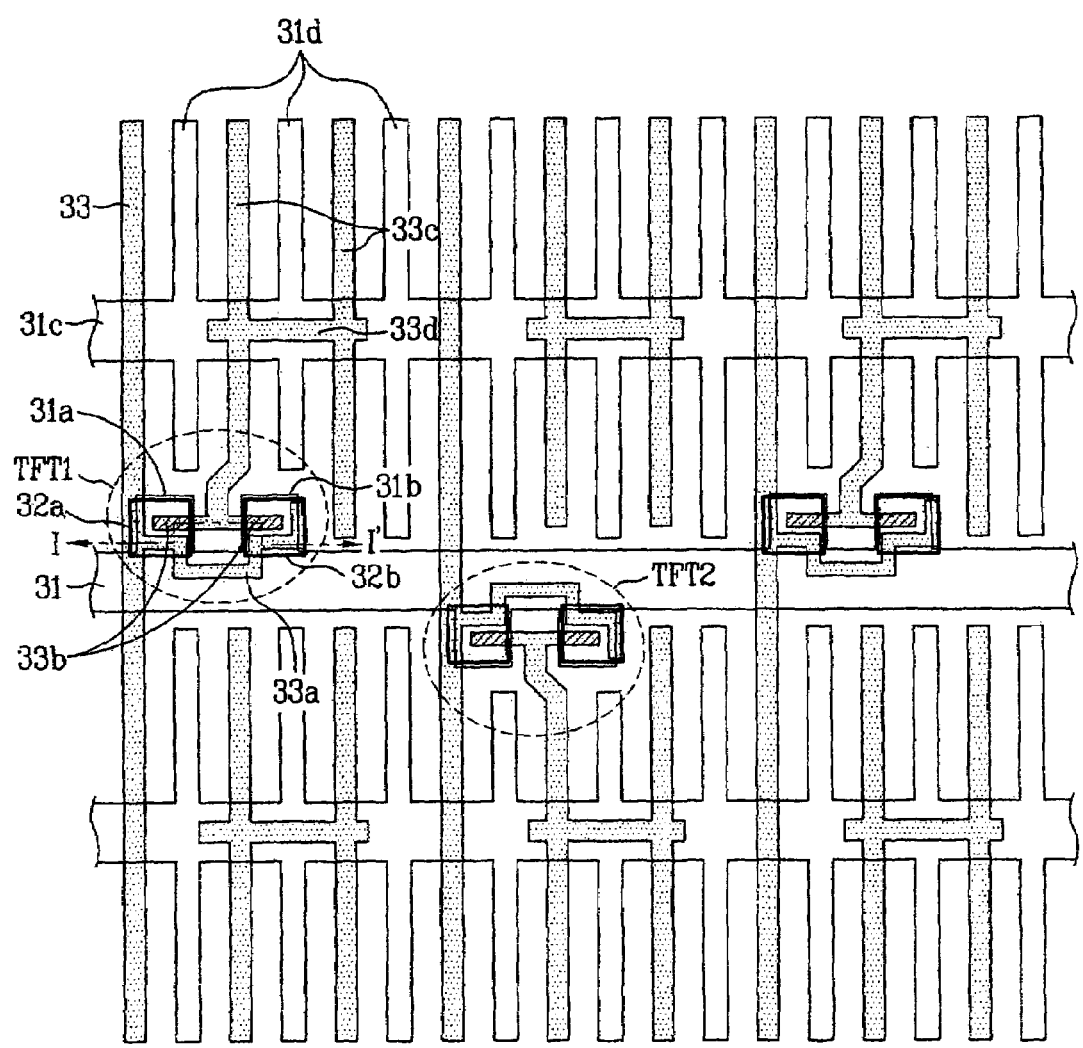
FIG. 4 illustrates a plan view of an LCD in accordance with a second embodiment of the present invention.

FIG. 4 illustrates a plan view of an LCD in accordance with a second embodiment of the present invention.

Referring to FIG. 4, the liquid crystal display device in accordance with a second embodiment of the present invention is the same with the liquid crystal display device in accordance with the first embodiment except with respect to forms of a source electrode 33a and a channel region.

In more detail, the source electrode 33a respectively has 'L' and 'J' forms at opposite ends overlapping the first and second gate electrodes 31a and 31b, and projected from one side of the data line 33, and extended from an upper part of the second gate electrode 31a to an upper part of the second gate electrode 31b. Therefore, the channel regions are also have 'L' and 'J' forms, respectively.

The liquid crystal display device in accordance with the second embodiment of the present invention has the same effect as the liquid crystal display device of the first embodiment of the present invention.

Though the foregoing thin film transistor is applied to the IPS type LCD, the thin film transistor can also be applied to a TN type LCD too.

Figure 5A:
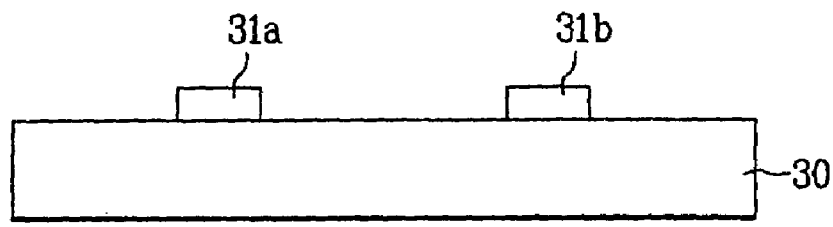
FIGS. 5A-5C illustrate sections across a line I-I' in FIG. 3 or 4, each showing the process of a method for fabricating a thin film transistor with a unit pixel region.
Figure 5B:
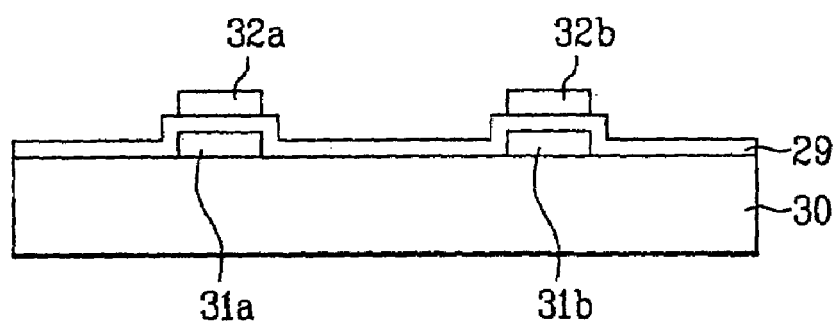
Figure 5C:
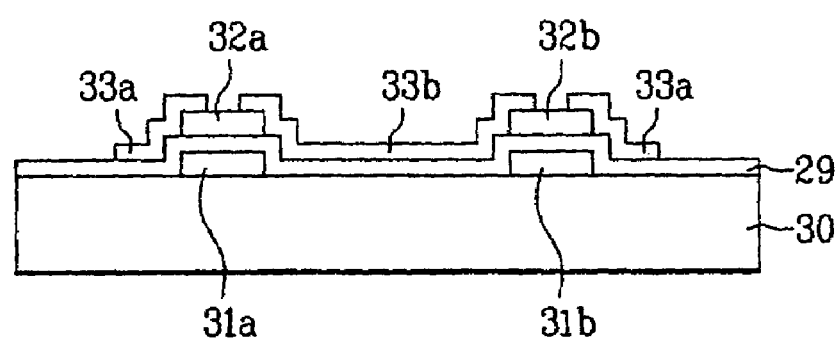

A method for fabricating a liquid crystal display device in accordance with an embodiment of the present invention will be described. FIGS. 5A-5C illustrate sections across a line I-I' in FIG. 3 or 4, each showing the steps of a method for fabricating a thin film transistor with a unit pixel region.

Referring to FIG. 5A, a conductive metal is deposited on a transparent lower substrate 30 and patterned by a photo-etching process to form a gate pad (not shown) having a large end with a predetermined area, a gate line 31 (see FIGS. 3 and 4) extended from the gate pad in one direction, and first and second gate electrodes 31a and 31b projected from the gate line 31 in one direction with a space therebetween.

The conductive metal is patterned to form a common line 31c and a plurality of common electrodes 31d on the gate line 31 at the same time as formation of the gate line 31. The common line 31c crosses the pixel region substantially parallel to the gate line 31.

The plurality of common electrodes 31d are arranged at regular intervals on each pixel region. The common electrodes 31d are symmetric with reference to the common line 31c. The conductive metal may be aluminum Al, chrome Cr, molybdenum Mo, or tungsten W.

Referring to FIG. 5B, a gate insulating film 29 is formed on an entire surface of the lower substrate 30 having the first and second electrodes 31a and 31b formed thereon. The gate insulating film 29 may be formed of silicon nitride SiNx or silicon oxide $SiO_2$.

Then, a semiconductor layer (amorphous silicon+impurity amorphous silicon) is formed on the gate insulating film 29.

The semiconductor layer is patterned by a photo-etching process to form first and second active layers 32a and 32b having an island shape over the gate electrodes 31a and 31b, respectively.

Referring to FIG. 5C, a conductive metal is deposited on an entire surface of the lower substrate 30 having the first and second active layers 32a and 32b formed thereon, and patterned by a photo-etching process to form a plurality of data lines 33 that are substantially perpendicular to the gate line 31 in one direction.

A source electrode 33a is formed and overlaps one side of the first and second gate electrodes 31a and 31b, respectively. The source electrode 33a is projected from one side of the data line 33 to have at least one opened side to have forks at the same time as the formation of the data line 33. A drain electrode 33b is formed between the forks and spaced a distance away from the source electrode 33a. The drain electrode 33b partly overlaps the first and second gate electrodes, respectively.

The source electrode 33a is projected and extended from one side of the data line 33 to serve as source electrodes 33a of the one pair of thin film transistors, and has opposite ends in the form of '⊂' and '⊃' that are symmetric to each other.

The drain electrode 33b is substantially parallel to the gate line 31, and shared at opposite sides thereof by the one pair of transistors in the same pixel region.

Thus, the one pair of transistors, having channel regions of '⊂' and '⊃' forms, respectively, is formed in the same pixel region.

The opposite ends of the source electrode 33a may have 'L' and 'J' forms, instead of the '⊂' and '⊃' forms. According to this, the channel regions would also have the 'L' and 'J' forms.

With formation of the source electrode 33a and the drain electrode 33b, pixel electrodes 33c are formed substantially parallel to and between the common electrode 31d at regular intervals. The pixel electrodes 33c are symmetric with reference to the common line and formed as a single unit with the drain electrode 33b.

Then, a storage electrode 33d is formed on a part of the common line 31c as one unit with the pixel electrode 33c.

Then, an organic insulating material is deposited on an entire surface of the lower substrate 30, having the data line 33 formed thereon, to form a protection film (not shown). The protection film is formed of a material selected from acryl, polyimide, BCB (Benzo Cyclo Butene), oxide, and nitride, to protect the first and second active layers 32a, and 32b from external moist and foreign matters.

Though not shown, an alignment film is formed on an entire surface of the lower substrate 30, inclusive of the pixel electrode 33c, of polyimide or photo-alignment material.

The alignment film of polyimide has an alignment direction set by mechanical rubbing, and the alignment film of photo-reactive material, such as a PVCN (polyvinylcinnamate) based material, or a polysiloxane based material has the alignment direction set by direction of a light, such as a UV beam. In this instance, the alignment direction is set by a direction of the light, or a characteristic of the light directed, i.e., a direction of polarization.

Though the foregoing thin film transistor is applied to a method for fabricating an IPS type LCD, the thin film transistor can also be applied to a method for fabricating a TN type LCD.

As has been described, the liquid crystal display device and method for fabricating the same of the present invention have the following advantages.

First, the substantially parallel arrangement of the drain electrode and the gate line helps to prevent the occurrence of a Cgd difference between adjacent pixels to prevent occurrence of picture quality drop, even if the gate line and the data line are misaligned in an up/down direction (Y-axis direction).

Second, in a large sized liquid crystal panel application, because no Cgd difference occurs, even if misalignment occurs at a shot interface region, a defective interface caused by stitching can be solved.

Third, even if the gate line and the data line are misaligned in a left/right direction (X-axis direction), reduction of the Cgd can be prevented, because overlap areas of the drain electrode with the first and second gate electrodes supplement each other.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a plurality of gate lines arranged on a substrate in one direction;
    a plurality of data lines substantially perpendicular to the gate lines to define pixel regions; and
    one pair of thin film transistors per pixel region, the pair of thin film transistors including:
        one pair of first and second gate electrodes projected from a gate line at one side of the pixel region;
        a drain electrode substantially parallel to the gate line, having opposite ends overlapping the first and second gate electrodes and formed between the first gate electrode and the second gate electrode; and
        a source electrode projected from solely one single data line at the one side of the pixel region to be adjacent to the opposite ends of the drain electrode and to overlap the first and second gate electrodes,
        wherein the data line at the one side of the pixel region and a date line at the other side of the pixel region are separately formed without connecting each other and the data line at the other side of the pixel region is not connected with the source electrode; and
        wherein pairs of thin film transistors are arranged in a zigzag pattern at opposite sides of the gate line.

2. The device as claimed in claim 1, wherein the source electrode includes:
    first and second parts respectively surrounding the opposite ends of the drain electrode; and
    a third part connecting the first part and the second parts.

3. The device as claimed in claim 2, wherein the first part and the second part are symmetric to each other.

4. The device as claimed in claim 2, wherein the first part and the second part have C-shaped forms, respectively.

5. The device as claimed in claim 1, wherein the source electrode includes:
    first and second parts respectively formed adjacent to opposite ends of the drain electrode, each of the first and second parts including a first section and a second section, the first section formed opposite one side of the end of respective end of the drain electrode; and
    a third part connecting the first part and the second part.

6. The device as claimed in claim 5, wherein the first part and the second part are symmetric to each other.

7. The device as claimed in claim 5, wherein the first part and the second part have 'L' shaped forms, respectively.

8. The device as claimed in claim 1, further comprising:
    common lines substantially parallel to the gate lines;
    a plurality of common electrodes substantially parallel to a data line; and
    pixel electrodes substantially parallel to and between the common electrodes.

9. The device as claimed in claim 8, wherein the pixel electrode and the drain electrode are connected to each other, and formed on a same layer.

10. The device as claimed in claim 8, wherein the common lines are on a same layer with the gate line.

11. The device as claimed in claim 8, wherein the common electrodes are on the same layer with the gate line.

12. The device as claimed in claim 8, wherein the common electrodes are symmetric with reference to the common line.

13. The device as claimed in claim 8, further comprising a storage electrode on the common line.

14. The device as claimed in claim 13, wherein the storage electrode connects the pixel electrodes together.

15. The device as claimed in claim 14, wherein the pixel electrodes are symmetric with reference to the storage electrode.

16. A method for fabricating a liquid crystal display device, comprising:
    providing a substrate;
    forming a plurality of gate lines in one direction on the substrate;
    forming data lines substantially perpendicular to the gate lines to define pixel regions, each pixel region having one pair of first and second gate electrodes at one side;
    forming a source electrode projected from solely one single data line at the one side of each pixel region and partly overlapping one side of each of the first and second gate electrodes; and
    forming a drain electrode substantially parallel to the gate line at each pixel, the drain electrode having opposite ends overlapping the first and second gate electrodes between the first gate electrode and the second electrode, and adjacent to the source electrode,
    wherein the data line at the one side of the pixel region and a date line at the other side of the pixel region are separately formed without connecting each other and the data line at the other side of the pixel region is not connected with the source electrode; and
    wherein source electrodes and drain electrodes are formed in a zigzag pattern at opposite sides of the gate line at adjacent pixel regions.

17. The method as claimed in claim 16, wherein forming a source electrode includes forming first and second parts, respectively, that surround the opposite ends of the drain electrode, and a third part connecting the first part and the second part.

18. The method as claimed in claim 17, wherein forming first and second parts include forming the first and second parts symmetric to each other.

19. The method as claimed in claim 17, wherein forming first and second parts include forming the first and second parts to have C-shaped forms.

20. The method as claimed in claim 17, wherein forming the first and second parts include forming the first and second parts to have L-shaped forms.

21. The method as claimed in claim 16, further comprising forming one pair of thin film transistors within one pixel region.

22. The method as claimed in claim 16, further comprising:
    forming common lines substantially parallel to the gate lines;
    forming a plurality of common electrodes connected to the common line and substantially parallel to a data line; and forming pixel electrodes arranged substantially parallel to and between the common electrodes.

23. The method as claimed in claim 22, wherein the pixel electrodes are formed on a same layer with the drain electrode.

24. The method as claimed in claim 22, wherein the common lines are formed on the same layer with the gate lines.

25. The method as claimed in claim 22, wherein the common electrodes are formed on the same layer with the gate lines.

26. The method as claimed in claim 22, wherein the common electrodes are symmetric with reference to the common line.

27. The method as claimed in claim 22, further comprising forming a storage electrode on the common line.

28. The method as claimed in claim 27, wherein the storage electrode connects the pixel electrode together.

29. The method as claimed in claim 28, wherein the pixel electrodes are symmetric within reference to the storage electrode.

* * * * *